United States Patent
Harada et al.

(10) Patent No.: US 8,636,824 B2
(45) Date of Patent: Jan. 28, 2014

(54) PRODUCTION METHOD FOR CARBONACEOUS MATERIAL-CONTAINING METAL OXIDE BRIQUETTES

(75) Inventors: Takao Harada, Kobe (JP); Hiroshi Sugitatsu, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 80 days.

(21) Appl. No.: 12/602,125

(22) PCT Filed: May 23, 2008

(86) PCT No.: PCT/JP2008/059527
§ 371 (c)(1),
(2), (4) Date: Nov. 27, 2009

(87) PCT Pub. No.: WO2008/146734
PCT Pub. Date: Dec. 4, 2008

(65) Prior Publication Data
US 2010/0175510 A1    Jul. 15, 2010

(30) Foreign Application Priority Data

May 28, 2007 (JP) ................................ 2007-140816

(51) Int. Cl.
*C22B 1/24* (2006.01)
(52) U.S. Cl.
USPC .................... 75/479; 75/746; 75/749; 75/750
(58) Field of Classification Search
USPC ................................ 75/479, 746, 749, 750
See application file for complete search history.

(56) References Cited

U.S. PATENT DOCUMENTS

| | | | |
|---|---|---|---|
| 3,189,436 A | 6/1965 | Burstlein | |
| 3,753,684 A * | 8/1973 | Van Latenstein | ............... 75/750 |

(Continued)

FOREIGN PATENT DOCUMENTS

| | | |
|---|---|---|
| CN | 1248636 A | 3/2000 |
| JP | 50-104102 | 8/1975 |

(Continued)

OTHER PUBLICATIONS

D.F. Ball et al., "Agglomeration of iron ores", 1973 (no month), American Elsevier Pub. Co, Inc. NY, chap 5 pp. 40-46 and chap. 13 pp. 149-153.*

(Continued)

*Primary Examiner* — Jie Yang
(74) *Attorney, Agent, or Firm* — Oblon, Spivak, McClelland, Maier & Neustadt, L.L.P.

(57) ABSTRACT

The present invention is directed to provide a production method for carbonaceous material-containing metal oxide briquettes, capable of ensuring sufficient strength of briquettes while using a metal oxide material containing a large amount of fine particles, such as steel mill dust. This method comprises a mixing step of mixing a metal oxide material A containing a large amount of fine particles with a carbonaceous material B in a mixer 15, to form a powdery mixture E, a compacting step of compacting the powdery mixture E using a briquette machine 17 to form compacts F, a classifying step of classifying the compacts F into an oversize fraction G and an undersize fraction H, using a sieve 18, and collecting the oversize fraction G as product briquettes, and a compact circulating step of returning a part of the compacts F to the mixer 15 or the briquette machine 17, as a recycle material.

41 Claims, 6 Drawing Sheets

(56) References Cited

U.S. PATENT DOCUMENTS

| | | | | |
|---|---|---|---|---|
| 3,848,744 A * | 11/1974 | Flaherty | ............ | 209/393 |
| 4,001,007 A * | 1/1977 | Sasaki et al. | ............ | 75/320 |
| 4,504,306 A * | 3/1985 | Miyashita et al. | ............ | 75/756 |
| 5,009,707 A * | 4/1991 | Noda et al. | ............ | 75/375 |
| 5,912,403 A | 6/1999 | Bilke | | |
| 6,302,938 B1 * | 10/2001 | Kamijo et al. | ............ | 75/316 |
| 6,802,886 B2 * | 10/2004 | Hoffman et al. | ............ | 75/484 |
| 2001/0047699 A1 | 12/2001 | Hoffman et al. | | |
| 2004/0020326 A1 * | 2/2004 | Ibaraki et al. | ............ | 75/313 |
| 2005/0050996 A1 * | 3/2005 | Gannon et al. | ............ | 75/751 |
| 2006/0278040 A1 | 12/2006 | Harada et al. | | |
| 2009/0090216 A1 | 4/2009 | Harada et al. | | |
| 2011/0226092 A1 | 9/2011 | Harada et al. | | |

FOREIGN PATENT DOCUMENTS

| | | |
|---|---|---|
| JP | 01-274879 | 11/1989 |
| JP | 5 339656 | 12/1993 |
| JP | 9 192896 | 7/1997 |
| JP | 11 92833 | 4/1999 |
| JP | 11 229047 | 8/1999 |
| JP | 2002-146444 | 5/2002 |
| JP | 2004 269978 | 9/2004 |
| JP | 2006-241577 | 9/2006 |
| JP | 2007 56306 | 3/2007 |
| KR | 10-0530815 | 11/2005 |

OTHER PUBLICATIONS

U.S. Appl. No. 12/670,741, Jan. 26, 2010, Sugitatsu.
Office Action issued Oct. 11, 2010, in China Patent Application No. 200880016800.5 (with English translation).
Extended European Search Report issued on Feb. 24, 2012 in the corresponding European Application No. 08764573.5.
Office Action issued Nov. 16, 2011, in Korean Patent Application No. 2009-7027027 with English and Japanese translations.
Combined Office Action and Search Report issued Oct. 22, 2012 in Chinese Application No. 201110258360.8 (With English Translation).
Office Action as received in the corresponding Japanese Patent Application No. 2008-138350 dated May 21, 2013 w/English Translation.

* cited by examiner

PRODUCTION METHOD FOR CARBONACEOUS MATERIAL-CONTAINING METAL OXIDE BRIQUETTES

TECHNICAL FIELD

The present invention relates to a method of producing carbonaceous material-containing metal oxide briquettes by subjecting a powdery mixture of a metal oxide material containing a large amount of fine particles, such as steel mill dust, and a carbonaceous material, such as pulverized coal, to a pressure forming process using a briquette machine.

BACKGROUND ART

A conventional reduced iron production process imposes restrictions, such as a need to use costly natural gas as a reducing agent for production, and a plant location generally limited to localities of natural gas. For this reason, great interest has recently been shown in a reduced ion production process using, as the reducing agent, coal which is relatively low in cost and capable of easing geographic restrictions on selection of a plant location. As this technique using coal, there have been proposed a large number of methods including charging a carbonaceous material-containing metal oxide prepared by agglomerating a powdery mixture of iron ore and coal into a rotary hearth furnace (RHF), and reducing it by heating in the rotary hearth furnace, to produce reduced iron (see, for example, Patent Documents 1 and 2).

The agglomeration of the powdery mixture of iron ore and coal includes spherical pelletization based on tumbling granulation using a pelletizer, cylindrical pelletization based on mechanical extrusion, and briquetting based on pressing using a briquette roll.

However, if a material is a type containing a large amount of fine particles, such as steel mill dust, the pelletization based on tumbling granulation has problems, such as 1) a granulation rate becomes lower to reduce productivity, 2) a large specific surface area of the material requires an amount of water for the granulation, thereby increasing an amount of heat required for drying (i.e., removing the water) in a subsequent process to increase energy consumption, and 3) the granulation becomes unstable by variation in a particle size of the material, which is likely to cause a fluctuation in production output.

Furthermore, the material must contain water in an amount greater than that in the tumbling granulation, in order to be fluidized for the pelletization based on extrusionmaterial. This causes a further increase in consumption of energy required for drying in a subsequent process.

For the briquetting using a briquette roll, may be used a twin roll-type briquette machine as disclosed, for example, in Patent Document 3 (in the Patent Document 3, a mixer and a pressure forming machine). This twin roll-type briquette machine comprises a pressure roll adapted to be drivenly rotated by a motor, and a hopper adapted to supply a material to the pressure roll from above, the hopper provided with a screw feeder for feeding the material therein.

The above twin roll-type briquette machine allows a liquid binder, such as molasses or lignin, to be used to enable a dried material to be agglomerated directly, i.e., without adding water thereto. This makes it possible to drastically reduce the consumption of energy required for drying in a subsequent process.

However, the inventor has found that a process of producing briquettes based on a material containing a large amount of fine particles, such as steel mill dust, and by use of the twin roll-type briquette machine, involves problems as shown in the following (1) to (3).

(1) Fine-particle material is hard to be reliably supplied into pockets of the pressure roll by only a gravity force applied to the material itself, thus being required to be forcibly fed to a pressure roll by a screw feeder. The material is therefore hardly supplied to a vicinity of a widthwise end of the pressure roll, as compared with a central portion thereof, which forms an undesirable distribution of compacting pressure in the widthwise direction of the pressure roll. This reduces strength of briquettes compacted around the widthwise end portion of the pressure roll.

(2) In agglomeration of a slippy material, such as electric furnace dust involving high jettability and containing oil, a feeding force of the screw feeder deviates in a radially outward direction of the screw feeder. This obstructs supply of the material to the pressure roll and increase in the briquette strength.

(3) Although a strong compression force of the pressure roll is applied to an outer surface of a briquette, the compacting pressure is hardly transmitted to a center of the briquette. This causes difficulty in achieving desired briquette strength.

The reduce in the briquette strength due to above (1)-(3) could be suppressed by lowering a rotational speed of the pressing roll so as to allow a material to be reliably supplied to the pockets of the pressure roll, but this approach involves significant deterioration in briquette production capacity of the briquette machine.

[Patent Document 1] JP 2004-269978A
[Patent Document 2] JP 09-192896A
[Patent Document 2] JP 11-092833A (paragraph [0026], FIG. 1)

DISCLOSURE OF THE INVENTION

It is an object of the present invention to provide a production method for carbonaceous material-containing metal oxide briquettes, capable of ensuring sufficient strength of briquettes while using a metal oxide material containing a large amount of fine particles, such as steel mill dust. This method comprises a mixing step of mixing a metal oxide material containing a large amount of fine particles with a carbonaceous material in a mixer to form a powdery mixture, a compacting step of compacting the powdery mixture using a briquette machine to form compacts, a classifying step of classifying the compacts into an oversize fraction and an undersize fraction, using a sieve, and collecting the oversize fraction as carbonaceous material-containing metal oxide briquettes that is a product, and a compacts circulating step of returning a part of the compacts to the mixer or the briquette machine, as a recycle material.

The method of the present invention may comprise a mixing step of mixing a metal oxide material containing a large amount of fine particles with a carbonaceous material in a mixer to form a powdery mixture, a first compacting step of compacting the powdery mixture using a first briquette machine to form first compacts, a second compacting step of re-compacting an entirety or a part of the first compacts using a second briquette machine to form second compacts, and a classifying step of classifying the second compacts into an oversize fraction and an undersize fraction, by a sieve, and collecting the oversize fraction as carbonaceous material-containing metal oxide briquettes that is a product.

BEST MODE FOR CARRYING OUT THE INVENTION

An embodiment of the present invention will now be specifically described based on the drawings.

Figure 1:
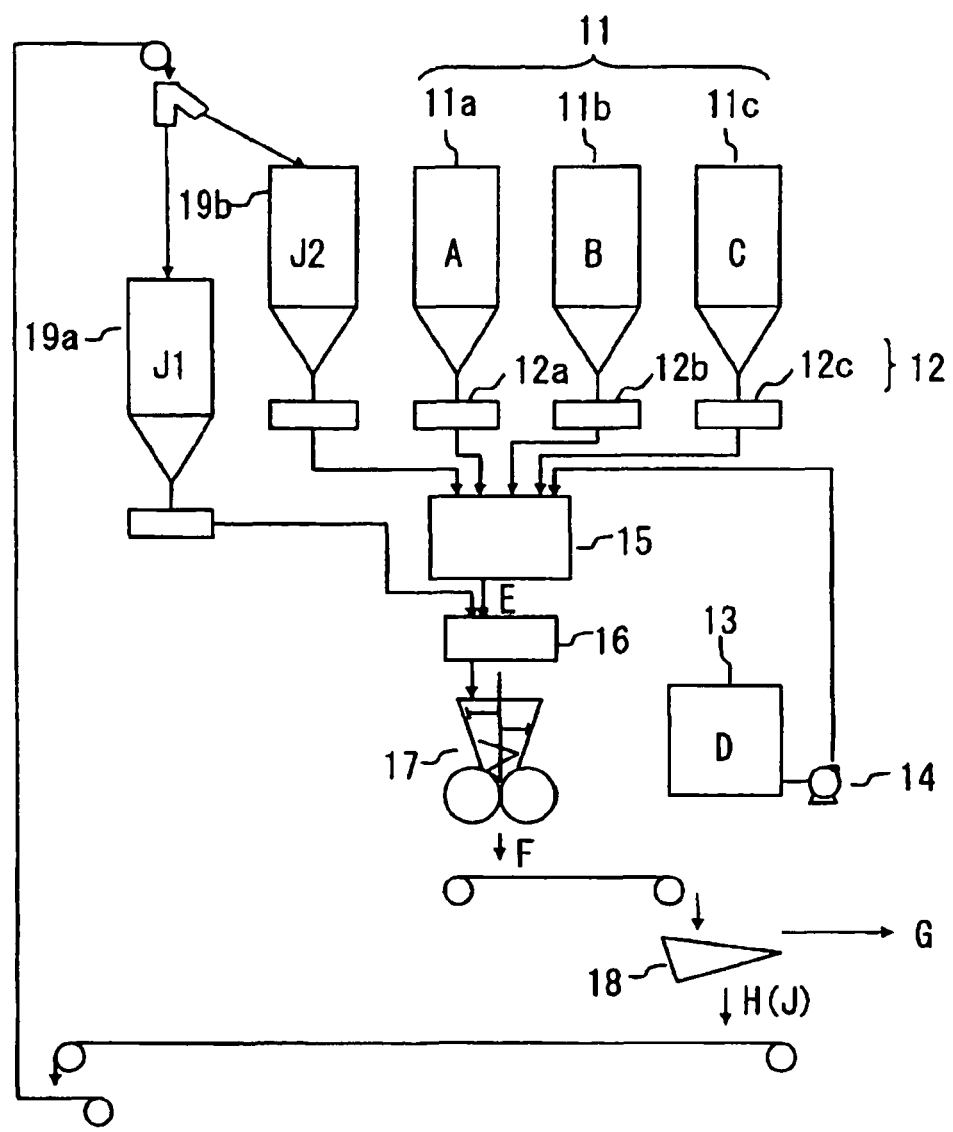
FIG. 1 is a flow diagram showing an outline of a carbonaceous material-containing metal oxide briquette production method according to a first embodiment of the present invention.

FIG. 1 is a flow diagram showing an outline of a carbonaceous material-containing metal oxide briquette production method according to a first embodiment of the present invention.

Illustrated in FIG. 1 are three material bins 11a, 11b, 11c, three feeders 12a, 12b, 12c corresponding to the respective material bins, a mixer 15, and a briquette machine 17. From the material bin 11a is discharged electric furnace dust A as a metal oxide material containing a large amount of fine particles through the feeder 12a, and from the material bin 11b is discharged powdered coal B as a carbonaceous material through the feeder 12b. From the material bin 11c is discharged slaked lime C which is a CaO source as an auxiliary material through the feeder 12c. Further, molasses D as a liquid binder is sent out from a tank 13 by a pump 14. These A, B, C and D are mixed together by the mixer 15 to form a powdery mixture E. This powdery mixture E is input into a hopper 5 via a surge hopper 16, as a material for use in the briquette machine 17 (i.e., briquette material).

Figure 7:
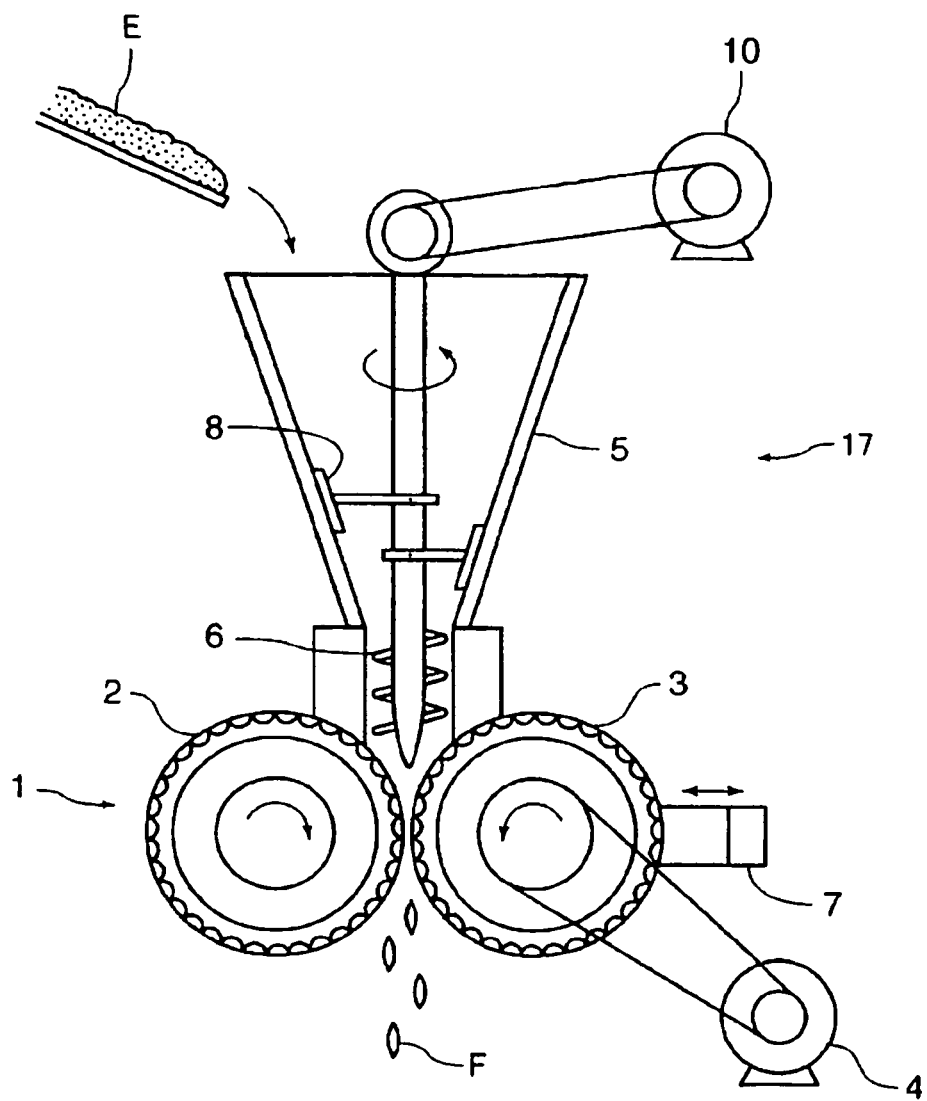
FIG. 7 is a vertical sectional view showing a schematic structure of a briquette machine for the first to fifth embodiments.

The briquette machine 17 is a twin roll type as shown in FIG. 7, which comprises a pressure roll 1 including a stationary rotating roll 2 and a movable rotating roll 3, a motor 4 for drivingly rotating the two rotating rolls 2 and 3, a hopper 5 disposed over and above the pressure roll 1 to supply the material thereto, a screw feeder 6 provided within the hopper 5 to force the material, a blade 8 adapted to be rotated within the hopper 5, and a hydraulic cylinder 7 for pressing the movable rotating roll 3 against the stationary rotating roll 2 of the pressure roll 1. There are no special limitation upon a specific structure of the briquette machine 17.

The material charged into the hopper 5 is forced-fed to the pressure roll 1 according to rotation of the screw feeder 6, while being prevented from attaching onto an inner wall surface of the hopper 5 by the rotation of the blade 8, and compress-formed (i.e., compacted) into compacts F each having a given shape, such as an almond shape or a pillow shape, in respective pockets formed in respective outer surfaces of the pair of rotating rolls 2, 3 making up the pressure roll 1.

Generally, a part of the compacts F having a particle size of 5 mm or less is undesirable as a material for use in a rotary hearth furnace, for example, due to formation of a deposit on a hearth, and therefore powdery or small briquettes are required to be removed therefrom. For this reason, the compacts F formed by the briquette machine 17 are classified into an oversize fraction G and an undersize fraction H by a sieve 18 having an opening of a given size (e.g., 5 mm), and the oversize fraction G are collected as product briquettes.

The undersize fraction H is distributed to two recycle material bins 19a, 19b and temporarily stored therein, as a recycle material J. From each of the recycle material bins 19a, 19b, an entirety or a part J1 of the recycle material J is returned to the surge hopper 16 and the remainder J2 to the mixer 15, respectively, and they are added to new materials (A+B+C). In cases where the entirety of the recycle material J is returned to the surge hopper 16, it is understood that no recycle material is returned to the mixer 15.

Thus, in this method, the entire undersize fraction H is circulatingly used in the above system, as the recycle material, thereby ensuring a high material yield, as with the method disclosed in the Patent Document 3.

While the remainder J2 of the recycle material J returned to the mixer 15 is fairly crushed to restore to powder form when mixed with the new materials (A+B+C) in the mixer 15, the part J1 of the recycle material J returned to the mixer 16 is never crushed by the mixer 15 because it is simply charged into the surge hopper 16 together with the powdery mixture E from the mixer 15. Thus, the agglomerated compacts remain in the briquette material to be supplied to the briquette machine 17.

Such an addition of the entirety or the part J1 of the recycle material J to the powdery mixture E enables the agglomerated compacts residing in the recycle material in a highly-densified state while smaller than the product briquettes G to make the following effects (a) to (c) during a compacting process using the briquette machine 17, thereby increasing strength of the product briquettes G.

(a) The addition of the highly-densified compacts increases a mean density of the entire material to facilitate supply based on its own weight, and increase an exclusion speed in the screw feeder.

(b) Even in a compacting process using a slippy material, such as electric furnace dust having high jettability and containing oil, a feeding force of the screw feeder will be more effectively transmitted to the entire material.

(c) The compacts can effectively transmit a compacting pressure applied from the pressure roll to a center of the briquette.

Although the product-briquette strength generally fluctuates according to variation in properties and particle size of the material, etc., adjusting a distribution ratio of the recycle material J between the surge hopper 16 and the mixer 15 makes it possible to easily ensure the strength of the product-briquette.

Modification of First Embodiment

The recycle material J1 to be returned to the briquette machine 17 is not limited to an entirety or a part of the undersize fraction H, but a part of the oversize fraction (product briquettes) G may be added to the entirety or the part of the undersize fraction H. This addition, while lowering a production speed of the product briquettes, increases an rate of agglomerated compacts to be supplied to the briquette machine 17 to enhance the product briquette strength.

The surge hopper 16 between the mixer 15 and the briquette machine 17 may be omitted. Specifically, the powdery mixture E from the mixer 15 and the entirety or the part J1 of the recycle material J from the recycle material bin 19 may be directly supplied to the briquette machine 17.

The recycle material J1 and the recycle material J2, to be distributed to the surge hopper 16 and the mixer 15 respectively, are not necessarily prepared to have the same particle size distribution. For example, the recycle material J may be further classified by an additional sieve having an opening smaller than that of the sieve 18, so that a large group containing a larger amount of agglomerated compacts is distributed to the surge hopper 16, as the J1, and a small group containing a larger amount of powdery compacts is distributed to the mixer 15, as the J2. This distribution makes it possible to reduce a rate of agglomerated compacts to be crushed through the mixer 15, in the recycle material J, so as to supply a larger amount of sound agglomerated compacts to the briquette machine, thus ensuring enhancement in the product briquette strength.

Alternatively, after the classification into the oversize fraction G and the undersize fraction H by the sieve 18, the oversize fraction G may be classified into an oversize fraction and an undersize fraction by an additional sieve to let the oversize fraction be served as product briquettes. In this case, the secondary screening just before charging into an RHF can reduce a supply of a material having a small particle size and low reducing ability to the RHF. In addition, the use of the material having a small particle size as a briquette material ensures enhancement in the product briquette strength.

As a CaO source to be added to the briquette material (powdery mixture) E, limestone ($CaCO_3$) or quicklime (CaO) may be used in place of slaked lime (Ca $(OH)_2$) used in the first embodiment. The amount of the addition of the CaO source is recommended to be set in the range of 1 to 10 mass % in CaO equivalent, with respect to the briquette material (powdery mixture) E.

Generally, in cases where molasses (blackstrap molasses) is used as a liquid binder for producing briquettes, the CaO source such as slaked lime is often added in combination with the molasses (wherein, quicklime is often used in place of the slaked lime for the material containing a large amount of water,). The purpose of the combined use of the molasses and the CaO source is however to enhance the briquette strength, and therefore the rate of the addition of the CaO source to the briquette material is typically less than 1 mass % in CaO equivalent.

However, the addition of the CaO source has also an effect of reducing a content of $SO_x$ in exhaust gas from a rotary hearth furnace based on a desulfurization action thereof. For the desulfurization action, the rate of the addition of the CaO source to the briquette material should be preferably 1% or more in CaO equivalent. On the other hand, since both slaked lime and quicklime, each used as the CaO source, are extremely-fine powder material, the addition of a large amount of the slaked lime and/or quicklime deteriorates compactability and strength of the briquette. Further, since each of slaked lime and limestone requires decomposition heat during a reduction treatment for briquettes in a rotary hearth furnace, the addition of a large amount of the slaked lime and/or limestone increases heat load of the rotary hearth furnace to cause an increase in energy consumption and deterioration in productivity rate of a reduced metal. For this reason, the CaO source is preferably added in an amount of 10 mass % or less in CaO equivalent, with respect to the briquette material. More preferable rate of the addition of the CaO source is in an amount of 2 to 5 mass % in CaO equivalent, with respect to the briquette material.

If the desulfurization is not required, it permits omission of the addition of the CaO source.

Figure 2:
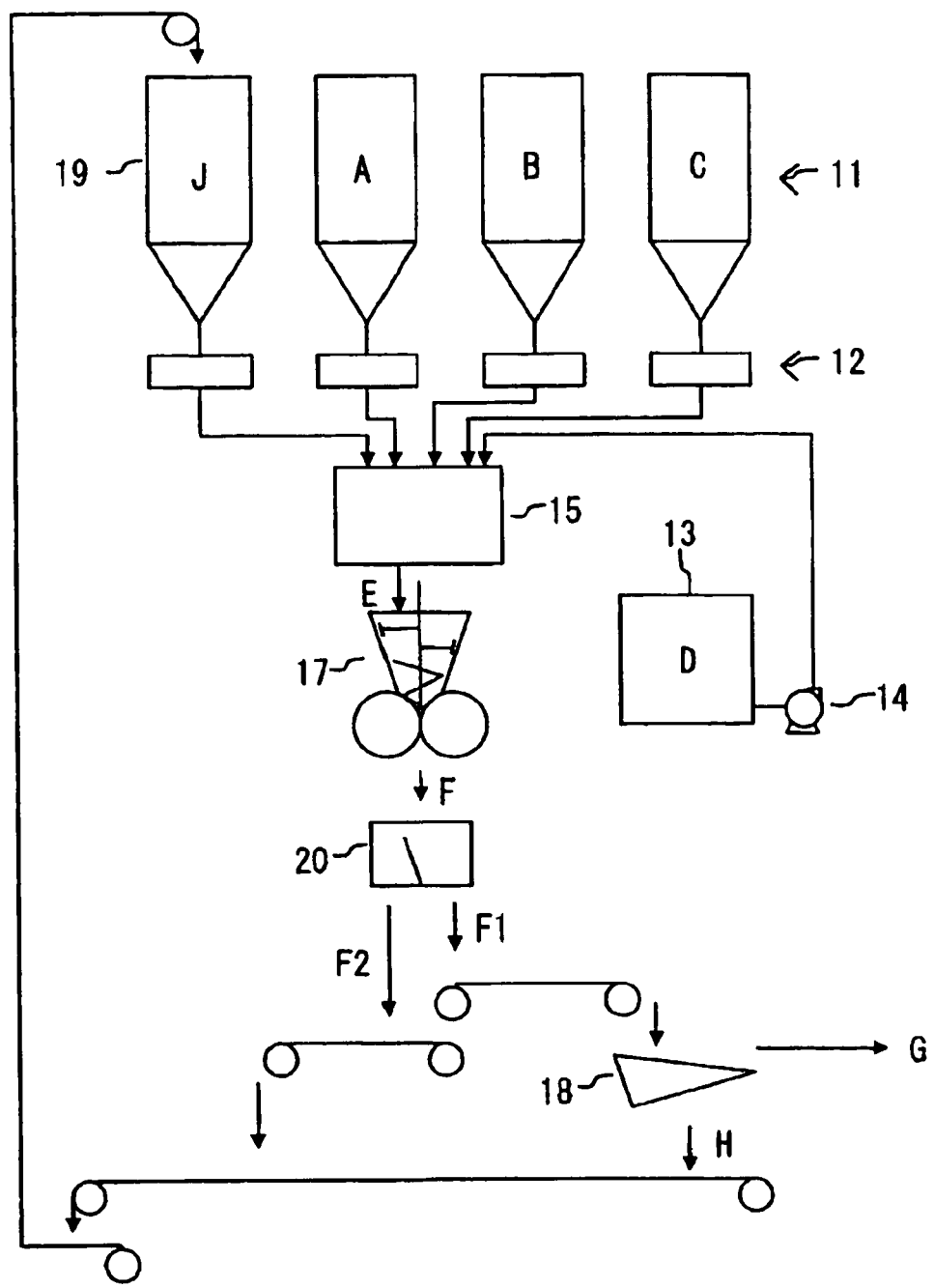
FIG. 2 is a flow diagram showing an outline of a carbonaceous material-containing metal oxide briquette production method according to a second embodiment of the present invention.

FIG. 2 shows an outline of a carbonaceous material-containing metal oxide briquette production method according to a second embodiment of the present invention. Concerning the second embodiment, a process of forming compacts F from a material (A+B+C) is the same as that in the first embodiment, and hence the description of the process will be omitted, while only a difference from the first embodiment will be specifically described below.

Compacts F formed by the briquette machine 17 are split into first and second groups (F1, F2) by a splitter 20, respectively. The first compacts F1 are classified into an oversize fraction G and an undersize fraction H by the sieve 18, and the oversize fraction G are collected as product briquettes. The second compacts F2 are directly mixed with the oversize fraction G without being classified, to form a recycle material J. The recycle material J is returned to the mixer 15 via the recycle material bin 9 to be added to new materials (A+B+C). The entire recycle material J is thus used in the above system circulatingly, which makes it possible to ensure a high material yield, as with the first embodiment.

The recycle material J, which is returned to the mixer 15 and subjected to a crushing action when mixed with new materials (A+B+C) in the mixer 15, contains agglomerated compacts having a particle size and high strength substantially equal to those of the product briquettes (oversize fraction) G, because the recycle material J contains the compacts F2 obtained by forming the compacts F by the briquette machine 17 and then simply splitting the compacts F by the splitter 20. Accordingly, the recycle material J is not fully powdered even by the crushing action, and thus supplied to the briquette machine 17, allowing agglomerated compacts having a certain level of particle size to remain in the powdery mixture E.

The briquette strength is therefore enhanced based on the same functions/effects as those described in connection with the first embodiment.

Modification of Second Embodiment

While the entire recycle material J is returned to the mixer 15 in the second embodiment, there may be provided a surge hopper between the mixer 15 and the briquette machine 17, wherein an entirety or a part of the recycle material J is returned to the surge hopper, and the remainder is returned to the mixer 15, in the same manner as that in the first embodiment. Further, as described in connection with the modification of the first embodiment, an entirety or a part of the recycle material J may be directly returned to the briquette machine 17 without installation of the above surge hopper.

Figure 3:
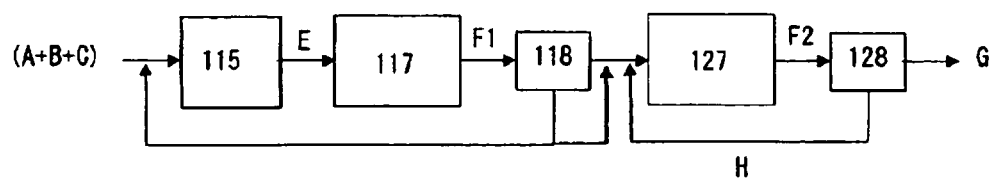
FIG. 3 is a flow diagram showing an outline of a carbonaceous material-containing metal oxide briquette production method according to a third embodiment of the present invention.

FIG. 3 shows a schematic flow of the production of carbonaceous material-containing metal oxide briquettes, according to a third embodiment of the present invention, wherein two briquette machines, a first briquette machine 117 and a second briquette machine 127, are installed in series relation to each other.

New materials (A+B+C) are mixed together by a mixer 115 to form a powdery mixture E, in the same manner as that in the first embodiment. The powdery mixture E is compacted in the first briquette machine 117 to form first compacts F1, and the first compacts F1 are re-compacted in the second briquette machine 127 to form second compacts F2, which are classified into an oversize fraction G and an undersize fraction H by a sieve 128. The oversize fraction G are collected as product briquettes, while the undersize fraction H are returned to the second briquette machine 127.

In the third embodiment, since agglomerated compacts are formed in the compacts F1 by the first briquette machine 117 to be supplied to the second briquette machine 127, high-strength product briquettes G can be obtained based on the same functions/effects as those in the first and second embodiments.

There may be provided an additional sieve 118 having a sieve opening larger than that of the sieve 128 between the first briquette machine 117 and the second briquette machine 127, wherein a part or an entirety of undersize fraction classified by the sieve 118 are returned to the mixer 115. This allows agglomerated compacts to easily survive despite a crushing action of the mixer 115 and be supplied to the first briquette machine 117. Thus, it can be expected that the strength of the compacts F1 becomes higher and thereby the strength of the product briquettes G also becomes higher.

Modification of Third Embodiment

The undersize fraction H classified by the sieve 128 may be returned to the mixer 115. Further, the additional sieve 118 installed between the first briquette machine 117 and the second briquette machine 127 may be omitted.

Figure 4:
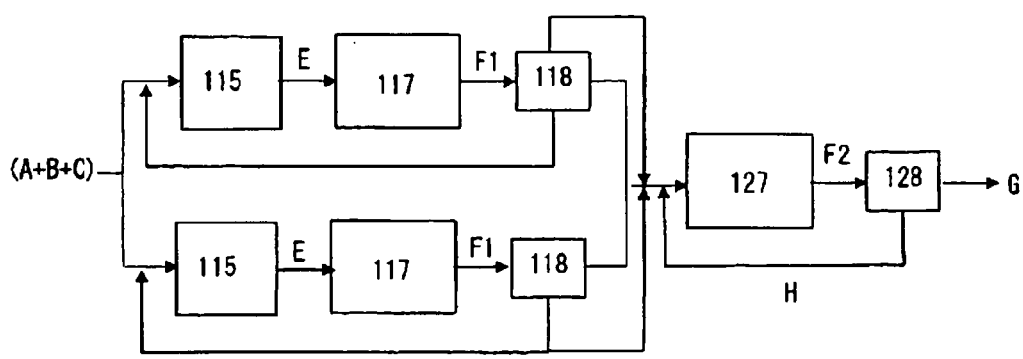
FIG. 4 is a flow diagram showing an outline of a carbonaceous material-containing metal oxide briquette production method according to a fourth embodiment of the present invention.

FIG. 4 shows a schematic flow of the production of carbonaceous material-containing metal oxide briquettes, according to a fourth embodiment of the present invention.

In the fourth embodiment is used a combination of two first briquette machines 117 and a single second briquette machine 127. When a number of the first briquette machine 117 is greater than a number of the second briquette machines 127, a larger amount of agglomerated compacts will be supplied to the second briquette machine 127. This ensures the effect of enhancing the strength of product briquettes G. In this embodiment, a mixer 115 and a sieve 118 are provided for each of the first briquette machines 117.

Modification of Fourth Embodiment

Each of the numbers of the first and second briquette machines 117, 127 is not limited to a specific value, as long as the number of the first briquette machine 117 is greater than the number of the second briquette machines 127. This value may be appropriately adjusted depending, for example, on a production capacity per briquette machine and/or a required strength of product briquettes G.

Minus-sieve compacts H classified by a sieve 128 may be returned to the mixer 115, and an additional sieve 118 installed between the first briquette machine 117 and the second briquette machine 127 may be omitted, as with the third embodiment.

Figure 5:
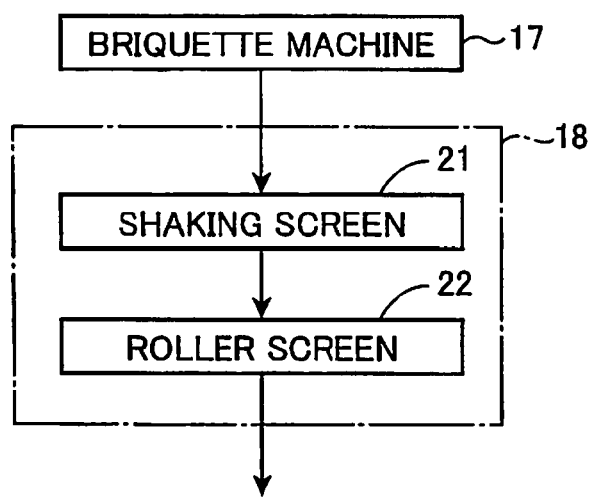
FIG. 5 is a flow diagram showing an outline of a carbonaceous material-containing metal oxide briquette production method according to a fifth embodiment of the present invention.

FIG. 5 shows a schematic flow of the production of carbonaceous material-containing metal oxide briquettes, according to a fifth embodiment of the present invention.

In the fifth embodiment is used a combination of a shaking screen 21 and a roller screen 22 as a sieve 18 for a classifying step. This combination achieves a desirable classification of compacts formed in a compacting process by a briquette machine, in a space-saving structure.

The shaking screen 21 comprises a mesh net for screening which has a flat plate shape for example, and an actuator adapted to shake the mesh net at a high speed, having a function of primarily classifying compacts placed on the mesh net and removing burrs from the compacts by the shaking. As the shaking screen 21A may be used a conventional commonly-known type. Left as an oversize fraction on the shaking screen 21 are compacts of large particle size, while dropped down as an undersize fraction are compacts of small particle size and the removed burrs.

The oversize fraction on the shaking screen 21 are carried into the roller screen 22, including the compacts and further powder attached on the respective compacts and/or generated from the compacts during the carrying. The roller screen 22 in this embodiment is designed to perform a secondary classification for solely removing the powder.

Figure 6:
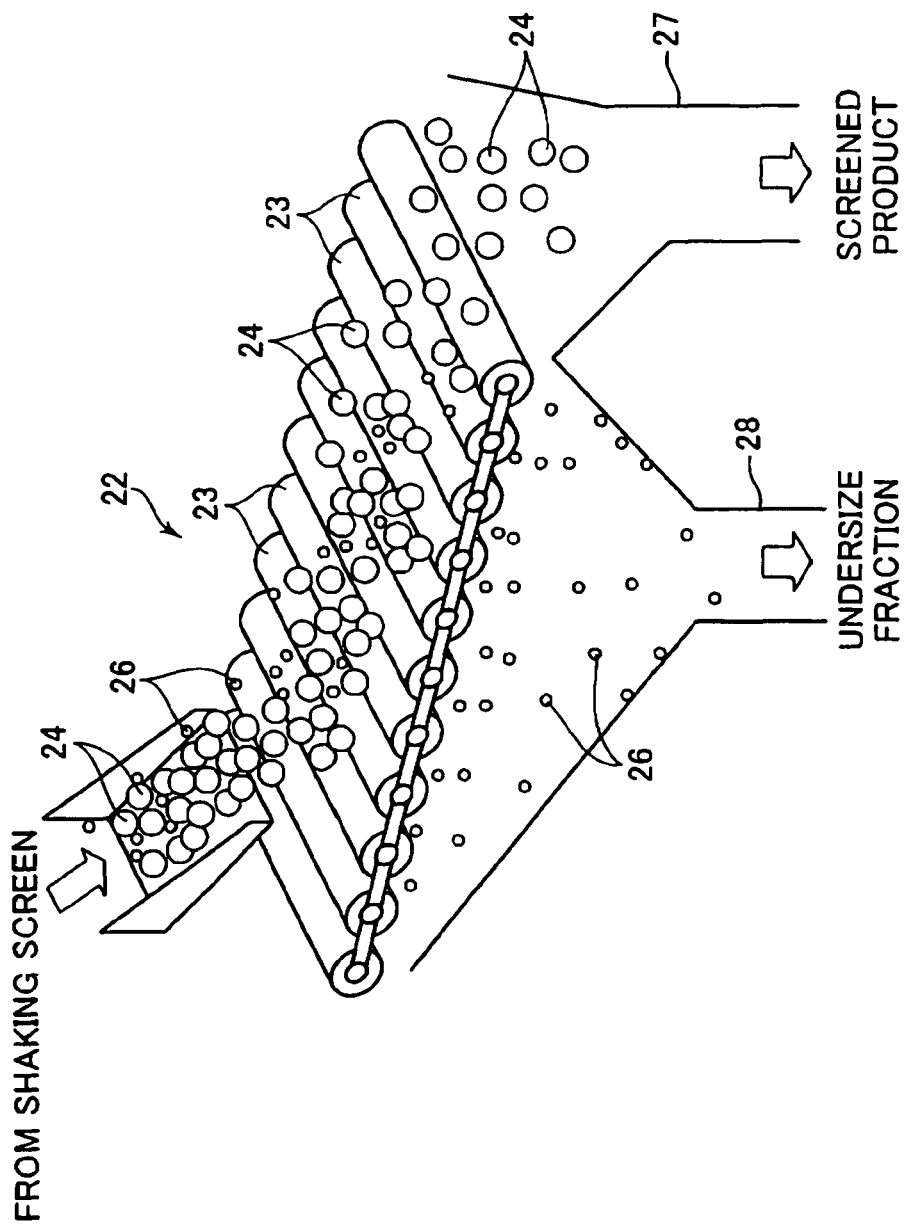
FIG. 6 is a perspective view showing a roller screen for use in the carbonaceous material-containing metal oxide briquette production method according to the fifth embodiment of the present invention

As the roller screen 22A may also be used a conventional commonly-known type. FIG. 6 shows one example of a structure thereof. The roller screen 22 illustrated in FIG. 6 comprises a plurality of rollers 23, which are arranged in a direction orthogonal to an axial direction thereof with appropriate gaps therebetween to allow the carry-in objects (i.e., a mixture of the compacts 24 and the powder 26) to roll on the rollers 23. The gap between adjacent ones of the rollers 23 has a size less than a particle size of the compacts 24 enough to leave on the shaking screen 21 as the oversize fraction and greater than a particle size of the powder 26 to be removed.

The compacts 24 leaving on the shaking screen 21 as the oversize fraction are carried out as a product through a duct 27, after rolling on the rollers 23. The powder 26 dropped through the gap between the adjacent rollers 23 as the undersize fraction is collected as a recycle material through a duct 28, and then returned to the briquette machine 17 or the mixer 15 in the same manner as that in each of the aforementioned embodiments. This achieves both providing high-quality briquettes from which the powder is removed and recycling the powder.

The size of the gap between the adjacent rollers 23 can be significantly easily set. That is because only large compacts are carried in the roller screen 22 after small compacts are screened out by the shaking screen 21 and therefore the roller screen 22 is simply required to classify between the large compacts and the powder 26 of an extremely small particle size. Further, Setting the gap at a small value can achieve reduction in size of the entire roller screen 22.

The roller screen 22 is effective as a means to remove powder attached on an outer surface of each compact, as compared with the shaking screen 21. Specifically, in the shaking screen 21, since compacts are simply placed on a surface of the sieve having a flat plate shape for example, the compact hardly makes contact with the sieve except at a bottom face of the compact, and hardly rolls on the sieve. Moreover, even if powder is detached from the compact, the powder might leave on a portion of the mesh net except its opening so as not to be dropped down from the sieve. In contrast, in the roller screen 22, powder on an outer surface of each compact is more likely to be detached while the compact rolls on the plurality of rollers 23. In addition, the detached powder cannot clear the gap between the adjacent rollers 23, thus reliably dropped down from the sieve.

Furthermore, differently from the shaking screen 21, the roller screen 22 is less likely to produce a shock against the compacts, which reduces a risk of causing crack in compacts as a product.

Accordingly, it is preferable also in view of improvement in quality that the roller screen 22 is provided on a downstream side of the shaking screen 21.

On the other hand, the shaking screen 21 provided on an upstream side of the roller screen 22 can contribute to improvement in quality by removing burrs of compacts carried therein, and further can contribute to facilitation of designing the roller screen 22 and reduction in size of the roller screen 22 by a primary classification on the upstream side of the roller screen 22 as above described.

Thus, a combination of the upstream shaking screen 21 and the downstream roller screen 22 can provide high-quality briquettes in a space-saving structure.

Modification Common to First to Fifth Embodiments

The metal oxide material containing a large amount of fine-particles, for use in the present invention, may include, in addition to the above-mentioned aforementioned electric furnace dust, the other steel making dust such as blast furnace dust, converter dust, mill scale; pulverized iron ore such as pellet feed; and pulverized ore containing non-ferrous metal oxides such as nickel oxide, chromium oxide, manganese oxide and titanium oxide.

Further, the carbonaceous material for use in the present invention may include, in addition to the aforementioned coal (pulverized coal), coke, oil coke, charcoal, wood chip, waste plastic and waste tire.

The liquid binder for use in the present invention may include lignin in addition to the aforementioned molasses.

Example

1) Production of Compound Material of Briquettes

Firstly, a compound material of briquettes is produced. As new materials, there are used a carbonaceous material (coal) and a metal oxide material (iron ore, electric furnace dust) each having an average particle size and a chemical composition as shown in the following Table 1. An undersize fraction of briquettes produced by use of only the new materials is collected separately as a recycle material. These materials are mixed together under a mixing condition as shown in the following Table 2, and then blackstrap molasses as the liquid binder is added thereto, in an amount of 4 mass % with respect to 100 mass % of the new materials except the recycle material, and mixed by a mixer to form a compound material of briquettes.

For the material No. 5 in Table 2, only the recycle material is used without new addition of blackstrap molasses. As the recycle material mixed with each of the material Nos. 2, 4, 5 and 6 in Table 2 is used an undersize fraction of briquettes (5 mm or less) pre-produced by use of a mixture of only new materials for each of the material Nos. 2, 4, 5 and 6.

In this example, coal and iron ore are pre-dried by a drier so as to have an amount of contained water less than 0.1 mass %, while the electric furnace dusts A, B are not subjected to drying because they are originally in a dried state. The blackstrap molasses contains a large amount of water which varies significantly varies, thus causing a variation of a water content in produced briquettes ranging from about 1 to 2 mass % based on dry measure.

TABLE 1

(a) CARBONACEOUS MATERIAL

| ITEM | UNIT | COAL |
|---|---|---|
| AVERAGE PARTICLE SIZE* | μm | 45 |
| INDUSTRIAL ANALYSIS VALUE | | |
| VOLATILE COMPOSITION | MASS % | 17.8 |
| ASH | MASS % | 9.3 |
| FIXED CARBON | MASS % | 72.9 |
| ELEMENTAL ANALYSIS VALUE | | |
| C | MASS % | 83.3 |
| H | MASS % | 4.1 |
| N | MASS % | 1.0 |
| S | MASS % | 0.3 |
| O | MASS % | 1.9 |

(b) METAL OXIDE MATERIAL

| ITEM | UNIT | IRON ORE | ELECTRIC FURNACE DUST A | ELECTRIC FURNACE DUST B |
|---|---|---|---|---|
| AVERAGE PARTICLE SIZE* | μm | 40~50 | 1.38 | 7.39 |
| COMPOSITION | | | | |
| T·Fe | MASS % | 67.5 | 19~28 | 19~31 |
| Zn | MASS % | 0 | 24~31 | 20~32 |
| Pb | MASS % | 0 | 2~3 | 2~3 |
| C | MASS % | 0 | 3.1 | 3.6 |
| OIL | MASS % | 0 | 0.9 | 2.2 |
| S | MASS % | 0.01 | 0.5 | 0.6 |
| $SiO_2$ | MASS % | 1.6 | 3.6 | 3.6 |
| CaO | MASS % | 0.03 | 3.2 | 3.3 |

(NOTE)
AVERAGE PARTICLE SIZE IS MEASURED BASED ON THE MICROTRAC METHOD. IT IS A PARTICLE SIZE AT A POINT OF 50% IN A CUMULATIVE CURVE OBTAINED ON AN ASSUMPTION THAT THE ENTIRE VOLUME OF A POWDER HAVING A PARTICLE SIZE DISTRIBUTION IS 100%

TABLE 2

| ITEM | UNIT | 1 | 2 | 3 | 4 | 5 | 6 |
|---|---|---|---|---|---|---|---|
| MIXING RATE *1 | MASS % | | | | | | |
| IRON ORE | MASS % | 74.0 | — | — | — | — | — |
| ELECTRIC FURNACE DUST A | MASS % | — | 88.3 | — | — | — | — |
| ELECTRIC FURNACE DUST B | MASS % | — | — | 88.3 | 88.3 | 88.3 | 84.8 |
| PULVERIZING COAL | MASS % | 26.0 | 11.7 | 11.7 | 11.7 | 11.7 | 11.2 |
| SLAKED LIME | MASS % | — | — | — | — | — | 4.0 |
| RECYCLE MATERIAL RATE *2 | MASS % | NONE | 16 | NONE | 16 | 100 | 16 |

(NOTE 1):
A MIXING RATIO IN NEW MATERIALS EXCEPT A RECYCLE MATERIAL
(NOTE 2):
RECYCLE MATERIAL RATE = RECYCLE MATERIAL/(RECYCLE MATERIAL + NEW MATERIALS)

2) Briquette Production Test

A test of producing briquettes by use of each of the above mixed materials is performed.

In this test, the briquette machine illustrated FIG. 7 is used. This briquette machine comprises a rotating roll which has a roll diameter of 520 mm, a roll width of 200 mm, and a pocket size of 30 mm length×25 mm width×7 mm depth. The briquette machine produces briquettes in a volume of about 10 cm$^3$.

The crushing strength of the briquettes is measured in conformity to ISO 4700. Specifically, with respect to ten briquettes, a compression load is applied to each of the briquettes in a thicknesswise direction thereof under a condition that it is laid down, to measure a minimum load at a time when each of the briquettes is broken. Then, an average of the ten minimum loads is calculated as the crushing strength. The "kgf", a unit of the compression strength, is equivalent to 9.80665 N.

The dropping strength of the briquettes is an average value of repeat counts of ten briquettes obtained by repeatedly dropping each of the briquettes from a height of 45 cm on an iron plate until it is cracked.

A result of the above measurements is shown in the following Table 3.

TABLE 3

| | UNIT | MATERIAL 1 | MATERIAL 2 | MATERIAL 3 | MATERIAL 4 | MATERIAL 5 | MATERIAL 6 |
|---|---|---|---|---|---|---|---|
| DROPPING STRENGTH | times | 21.6 | 11.0 | 3.9 | 8.9 | 10.5 | 7.9 |
| CRUSHING STRENGTH | kgf per briquette | 45.8 | 11.1 | 7.0 | 12.7 | 34.8 | 15.9 |
| PRODUCTION SPEED | t/h | 4.6 | 2.5 | 1.3 | 1.6 | 2.5 | 1.6 |

As seen in Table 3, the mixed material No. 1 produced by use of iron ore as the metal oxide material provides not only a high briquette strength (both the dropping strength and the crushing strength) but also a high production speed. That would be because the iron ore has such a large average particle size that a problem with the use of a fine-particle material is not occurred.

In the mixed material Nos. 2 to 5 using electric furnace dust as the metal oxide material, an average particle size of the electric furnace dust is fairly less than that of the iron ore, and therefore, both the briquette strength and the production speed are lower than those of the mixed material No. 1. In a comparison the results of the mixed material Nos. 2 with Nos. 4, although they have similar average particle sizes and the same rate of the added recycle material, the mixed material No. 4 has a lower production speed. Specifically, as to the mixed material No. 4, the production speed is reduced to 1.6 t/h, because the production speed of the mixed material No. 4 increased up to 2.5 t/h which is equal to that of the mixed material No. 2 would reduce briquette strength so as to make a production of briquettes impossible. The reason is probably that, although they have similar particle sizes and chemical compositions, an oil content of the mixed material No. 4 is greater than that of the mixed material No. 2, and therefore a feeding force of the screw feeder in the hopper above the briquette machine is lowered, to cause the problem that briquettes having a certain level of strength cannot be produced without lowering the briquette production speed.

The mixed material Nos. 3 to 5 are samples where the rate of the added recycle material is changed. They show that the increase in the rate of the added recycle material raises both the briquette strength (both the dropping strength and the crushing strength) and the production rate.

The mixed material No. 6 is a sample for verifying an effect of adding slaked lime to the mixed material No. 4. It shows that, although slaked lime as a fine-particle material is added in a larger amount (4 mass %) than a typical amount (less than 1 mass %) when it is used as a binder, the concomitant use of the recycle material can prevent deterioration in briquette strength (both the dropping strength and the crushing strength).

The above results show that the addition of the recycle material, in which agglomerated compacts in the recycle are fairly crushed, apt to enhance the briquette strength because the recycle material is mixed with the new materials by the mixer due to structural restrictions of a testing facility. This proves that the use of the present invention makes it possible to enhance the product briquette strength without deterioration in productivity while using a material containing fine particles.

As mentioned above, the present invention provides a method for producing carbonaceous material-containing metal oxide briquettes. The method comprises a mixing step of mixing a metal oxide material containing a large amount of fine particles with a carbonaceous material in a mixer to form a powdery mixture, a compacting step of compacting the powdery mixture, using a briquette machine to form compacts, a classifying step of classifying the compacts into an oversize fraction and an undersize fraction, using a sieve, and collecting the oversize fraction as carbonaceous material-containing metal oxide briquettes as a product, and a compacts circulating step of returning a part of the compacts to the mixer or the briquette machine, as a recycle material.

In this method, an entirety or a part of the compacts precompacted by the briquette machine are added as a recycle material to new materials, and the obtained mixture is re-compacted by the briquette machine. This provides the following functions/effects.

(1) The addition of the highly-densified compacts increases a mean density of the entire materials to facilitate supply of them based on their own weight.

(2) Even in cases where a slippy material such as electric furnace dust having high jettability and containing oil is used, a feeding force in a screw feeder or the like will be more effectively transmitted to the entire material, and further a feeding speed will be raised.

(3) A compacting pressure applied from the pressure roll will be more effectively transmitted to a center of the briquette through the compacts therein.

These functions/effects makes the briquette strength higher.

In this method, the compact circulating step may include returning an entirety or a part of the undersize fraction to the briquette machine, as the recycle material, or may include returning a part of the oversize fraction to the mixer or the briquette machine, as the recycle material. Alternatively, the compact circulating step may include returning a sum of an entirety or a part of the undersize fraction and a part of the oversize fraction to the mixer or the briquette machine, as the recycle material, or may include returning a sum of a part of the compact before classified and an entirety or a part of the undersize fraction to the mixer or the briquette machine, as the recycle material.

The present invention also provides a method of producing carbonaceous material-containing metal oxide briquettes, which comprises a mixing step of mixing a metal oxide material containing a large amount of fine particles with a carbonaceous material in a mixer to form a powdery mixture, a first compacting step of compacting the powdery mixture using a first briquette machine to form first compacts, a second compacting step of re-compacting an entirety or a part of the first compacts using a second briquette machine to form second compacts, and a classifying step of classifying the second compacts into an oversize fraction and an undersize fraction, using a sieve, and collecting the oversize fraction as carbonaceous material-containing metal oxide briquettes as a product.

In this method, the first briquette machine may be made up of a plural number of briquette machines installed in parallel relation to each other, wherein the number is greater than a number of briquette machines which make up as the second briquette machine. In this case, agglomerated compacts is supplied to the second briquette machine in a larger amount to ensure the effect of increasing the strength of the product briquettes Further, the present invention provides a method for producing carbonaceous material-containing metal oxide briquettes, which comprises a mixing step of mixing a metal oxide material containing a large amount of fine particles with a carbonaceous material in a mixer to form a powdery mixture, a compacting step of compacting the powdery mixture using a briquette machine to form compacts, a classifying step of classifying the compacts into a first oversize fraction and a first undersize fraction using a shaking screen, then secondarily classifying the first oversize fraction into a second oversize fraction and a second undersize fraction, using a roller screen including a plurality of rollers, and collecting the second oversize fraction classified by the roller screen, as carbonaceous material-containing metal oxide briquettes as a product, and a compacts circulating step of returning the second undersize fraction classified by the roller screen to the mixer or the briquette machine, as a recycle material.

In this method, a combination of the shaking screen disposed on an upstream side and the roller screen disposed on a downstream side makes it possible to desirably classify compacts formed through the compacting step by use of the briquette machine, in a space-saving structure.

Specifically, the shaking screen is designed to classify the compacts while shaking them, thereby removing burrs formed on the compacts therefrom and screen out the burrs together with small compacts as the first undersize fraction, while leaving large-sized compacts together with powder attached on respective outer surfaces thereof as the first oversize fraction. Then, the first oversize fraction and the powder attached thereon are screened by the roller screen to provide high-quality compacts after removal of the powder as a product. The screening based on the rollers can suppress powdering the compacts, as compared with the screening based on shaking The above roller screen is preferable to have such a gap dimension between the adjacent ones of the rollers as to classify the powder existing together with the compacts supplied from the shaking screen as the second undersize fraction and the compacts as the second oversize fraction, respectively.

In each of the above methods, the mixing step preferably includes further adding a CaO source to the powdery mixture, in an amount of 1 to 10 mass % in CaO equivalent.

The invention claimed is:

1. A method for producing carbonaceous material-comprising metal oxide briquettes, said method consisting essentially of:
   mixing a fine-particle metal oxide material having an average particle size of 50 μm or less with a carbonaceous material in a mixer to form a dry powdery mixture;
   compacting said dry powdery mixture without adding water using a pressure-compacting twin roll-type briquette machine to form compacts;
   classifying said compacts into an oversize fraction and an undersize fraction, using a sieve, and collecting said oversize fraction of carbonaceous material-comprising metal oxide briquettes; and
   circulating a part of said compacts by returning a part of said compacts to said mixer or said briquette machine, as a recycle material.

2. The method as defined in claim 1, wherein said circulating includes returning an entirety or a part of said undersize fraction to said briquette machine, as said recycle material.

3. The method as defined in claim 1, wherein said circulating includes returning a part of said oversize fraction to said mixer or said briquette machine, as said recycle material.

4. The method as defined in claim 1, wherein said circulating includes returning a sum of an entirety or a part of said undersize fraction and
   a part of said oversize fraction to said mixer or said briquette machine, as said recycle material.

5. The method as defined in claim 1, wherein said circulating includes returning a sum of a part of said compact before classified and an entirety or a part of said undersize fraction to said mixer or said briquette machine, as said recycle material.

6. The method as defined in claim 1, wherein said classifying includes classifying said compacts into said oversize fraction and said undersize fraction using a sieve, then secondarily classifying said oversize fraction into an oversize fraction and an undersize fraction, using another sieve, and collecting said secondarily classified oversize fraction as carbonaceous material-comprising metal oxide briquettes.

7. The method as defined in claim 1, wherein said mixing includes further adding a CaO source to said powdery mixture, in an amount of from 1 to 10 mass % in CaO equivalent.

8. The method as defined in claim 1, wherein said fine-particle metal oxide material is selected from the group consisting of electric furnace dust, blast furnace dust, converter dust, mill scale, pulverized iron ore, and pulverized ore containing non-ferrous metal oxides.

9. The method as defined in claim 1, wherein said fine-particle metal oxide material has an average particle size ranging from 1.38-50 μm.

10. The method as defined in claim 1, wherein said fine-particle metal oxide material has an average particle size ranging from 1.38-7.39 μm.

11. A method for producing carbonaceous material-comprising metal oxide briquettes, consisting essentially of:
    mixing a fine-particle metal oxide material having an average particle size of 50 μm or less with a carbonaceous material in a mixer to form a dry powdery mixture;
    compacting said dry powdery mixture without adding water using a pressure-compacting twin roll-type first briquette machine to form first compacts;

re-compacting an entirety or a part of said first compacts without adding water using a second pressure-compacting twin roll-type briquette machine to form second compacts; and classifying said second compacts into an oversize fraction and an undersize fraction, using a sieve, and collecting said oversize fraction of carbonaceous material-comprising metal oxide briquettes.

12. The method as defined in claim 11, wherein said first briquette machine comprises a plural number of briquette machines installed in parallel relation to each other, wherein said number is greater than a number of briquette machines which make up as said second briquette machine.

13. The method as defined in claim 11, wherein said fine-particle metal oxide material is selected from the group consisting of electric furnace dust, blast furnace dust, converter dust, mill scale, pulverized iron ore, and pulverized ore containing non-ferrous metal oxides.

14. The method as defined in claim 11, wherein said fine-particle metal oxide material has an average particle size ranging from 1.38-50 μm.

15. The method as defined in claim 11, wherein said fine-particle metal oxide material has an average particle size ranging from 1.38-7.39 μm.

16. A method for producing carbonaceous material-comprising metal oxide briquettes, said method consisting essentially of:
mixing a fine-particle metal oxide material having an average particle size of 50 μm or less with a carbonaceous material in a mixer to form a dry powdery mixture;
compacting said dry powdery mixture without adding water using a pressure-compacting twin roll-type briquette machine to form compacts;
classifying said compacts into a first oversize fraction and a first undersize fraction using a shaking screen, then secondarily classifying said first oversize fraction into a second oversize fraction and a second undersize fraction, using a roller screen including a plurality of rollers, and collecting said second oversize fraction classified by said roller screen of carbonaceous material-comprising metal oxide briquettes; and
circulating a part of said compacts by returning said second undersize fraction classified by said roller screen to said mixer or said briquette machine, as a recycle material.

17. The method as defined in claim 16, wherein said roller screen has such a gap dimension between adjacent ones of said rollers as to classify powder comprising burrs removed from said compacts by said shaking screen as the second undersize fraction and said compacts as the second oversize fraction, respectively.

18. The method as defined in claim 16, wherein said fine-particle metal oxide material is selected from the group consisting of electric furnace dust, blast furnace dust, converter dust, mill scale, pulverized iron ore, and pulverized ore containing non-ferrous metal oxides.

19. The method as defined in claim 16, wherein said fine-particle metal oxide material has an average particle size ranging from 1.38-50 μm.

20. The method as defined in claim 16, wherein said fine-particle metal oxide material has an average particle size ranging from 1.38-7.39 μm.

21. A method for producing carbonaceous material-comprising metal oxide briquettes, consisting essentially of:
mixing a fine-particle metal oxide material having an average particle size of 50 μm or less with a carbonaceous material in a mixer to form a powdery mixture containing less than 0.1 mass % water;
adding a liquid binder selected from the group consisting of molasses, lignin, and mixtures thereof, to the powdery mixture;
compacting the resulting mixture without adding water using a briquette machine to form compacts;
classifying said compacts into an oversize fraction and an undersize fraction, using a sieve, and collecting said oversize fraction of carbonaceous material-comprising metal oxide briquettes; and
circulating a part of said compacts by returning a part of said compacts to at least said briquette machine, as a recycle material.

22. The method as defined in claim 21, wherein said circulating includes returning an entirety or a part of said undersize fraction to said briquette machine, as said recycle material.

23. The method as defined in claim 21, wherein said circulating includes returning a part of said oversize fraction to said mixer or said briquette machine, as said recycle material.

24. The method as defined in claim 21, wherein said circulating includes returning a sum of an entirety or a part of said undersize fraction and a part of said oversize fraction to said mixer or said briquette machine, as said recycle material.

25. The method as defined in claim 21, wherein said circulating includes returning a sum of a part of said compact before classified and an entirety or a part of said undersize fraction to said mixer or said briquette machine, as said recycle material.

26. The method as defined in claim 21, wherein said classifying includes classifying said compacts into said oversize fraction and said undersize fraction using a sieve, then secondarily classifying said oversize fraction into an oversize fraction and an undersize fraction, using another sieve, and collecting said secondarily classified oversize fraction as carbonaceous material-comprising metal oxide briquettes.

27. The method as defined in claim 21, wherein said mixing includes further adding a CaO source to said powdery mixture, in an amount of from 1 to 10 mass % in CaO equivalent.

28. The method as defined in claim 21, wherein said fine-particle metal oxide material is selected from the group consisting of electric furnace dust, blast furnace dust, converter dust, mill scale, pulverized iron ore, and pulverized ore containing non-ferrous metal oxides.

29. The method as defined in claim 21, wherein said fine-particle metal oxide material has an average particle size ranging from 1.38-50 μm.

30. The method as defined in claim 21, wherein said fine-particle metal oxide material has an average particle size ranging from 1.38-7.39 μm.

31. A method for producing carbonaceous material-comprising metal oxide briquettes, consisting essentially of:
mixing a fine-particle metal oxide material having an average particle size of 50 μm or less with a carbonaceous material in a mixer to form a powdery mixture containing less than 0.1 mass % water;
adding a liquid binder selected from the group consisting of molasses, lignin, and mixtures thereof, to the powdery mixture;
compacting the resulting mixture without adding water using a first briquette machine to form first compacts;
re-compacting an entirety or a part of said first compacts using a second briquette machine to form second compacts;
classifying said second compacts into an oversize fraction and an undersize fraction, using a sieve, and collecting said oversize fraction of carbonaceous material-comprising metal oxide briquettes; and circulating a part of said second compacts by returning a part of said second compacts to at least said briquette machine, as a recycle material.

32. The method as defined in claim 31, wherein said first briquette machine comprises a plural number of briquette machines installed in parallel relation to each other, wherein said number is greater than a number of briquette machines which make up as said second briquette machine.

33. The method as defined in claim 31, wherein said fine-particle metal oxide material is selected from the group consisting of electric furnace dust, blast furnace dust, converter dust, mill scale, pulverized iron ore, and pulverized ore containing non-ferrous metal oxides.

34. The method as defined in claim 31, wherein said fine-particle metal oxide material has an average particle size ranging from 1.38-50 μm.

35. The method as defined in claim 31, wherein said fine-particle metal oxide material has an average particle size ranging from 1.38-7.39 μm.

36. A method for producing carbonaceous material-comprising metal oxide briquettes, said method consisting essentially of:
mixing a fine-particle metal oxide material having an average particle size of 50 μm or less with a carbonaceous material in a mixer to form a powdery mixture containing less than 0.1 mass % water;
adding a liquid binder selected from the group consisting of molasses, lignin, and mixtures thereof, to the powdery mixture;
compacting the resulting mixture without adding water using a briquette machine to form compacts;
classifying said compacts into a first oversize fraction and a first undersize fraction using a shaking screen, then secondarily classifying said first oversize fraction into a second oversize fraction and a second undersize fraction, using a roller screen including a plurality of rollers, and collecting said second oversize fraction classified by said roller screen of carbonaceous material-comprising metal oxide briquettes; and
circulating a part of said compacts by returning said second undersize fraction classified by said roller screen to at least said briquette machine, as a recycle material.

37. The method as defined in claim 36, wherein said roller screen has such a gap dimension between adjacent ones of said rollers as to classify powder comprising burrs removed from said compacts by said shaking screen as the second undersize fraction and said compacts as the second oversize fraction, respectively.

38. The method as defined in claim 36, wherein said fine-particle metal oxide material is selected from the group consisting of electric furnace dust, blast furnace dust, converter dust, mill scale, pulverized iron ore, and pulverized ore containing non-ferrous metal oxides.

39. The method as defined in claim 36, wherein said fine-particle metal oxide material has an average particle size ranging from 1.38-50 μm.

40. The method as defined in claim 36, wherein said fine-particle metal oxide material has an average particle size ranging from 1.38-7.39 μm.

41. A method for producing carbonaceous material-comprising metal oxide briquettes, consisting essentially of:
mixing a fine-particle metal oxide material having an average particle size of 50 μm or less with a carbonaceous material in a mixer to form a powdery mixture containing less than 0.1 mass % water;
adding a liquid binder selected from the group consisting of molasses, lignin, and mixtures thereof, to the powdery mixture;
compacting the resulting mixture without adding water using a briquette machine to form compacts;
classifying said compacts into an oversize fraction and an undersize fraction, using a sieve, and collecting said oversize fraction of carbonaceous material-comprising metal oxide briquettes; and
circulating a part of said oversize fraction by returning a part of said oversize fraction to said mixer or said briquette machine, as a recycle material.

* * * * *